Patented Oct. 9, 1923.

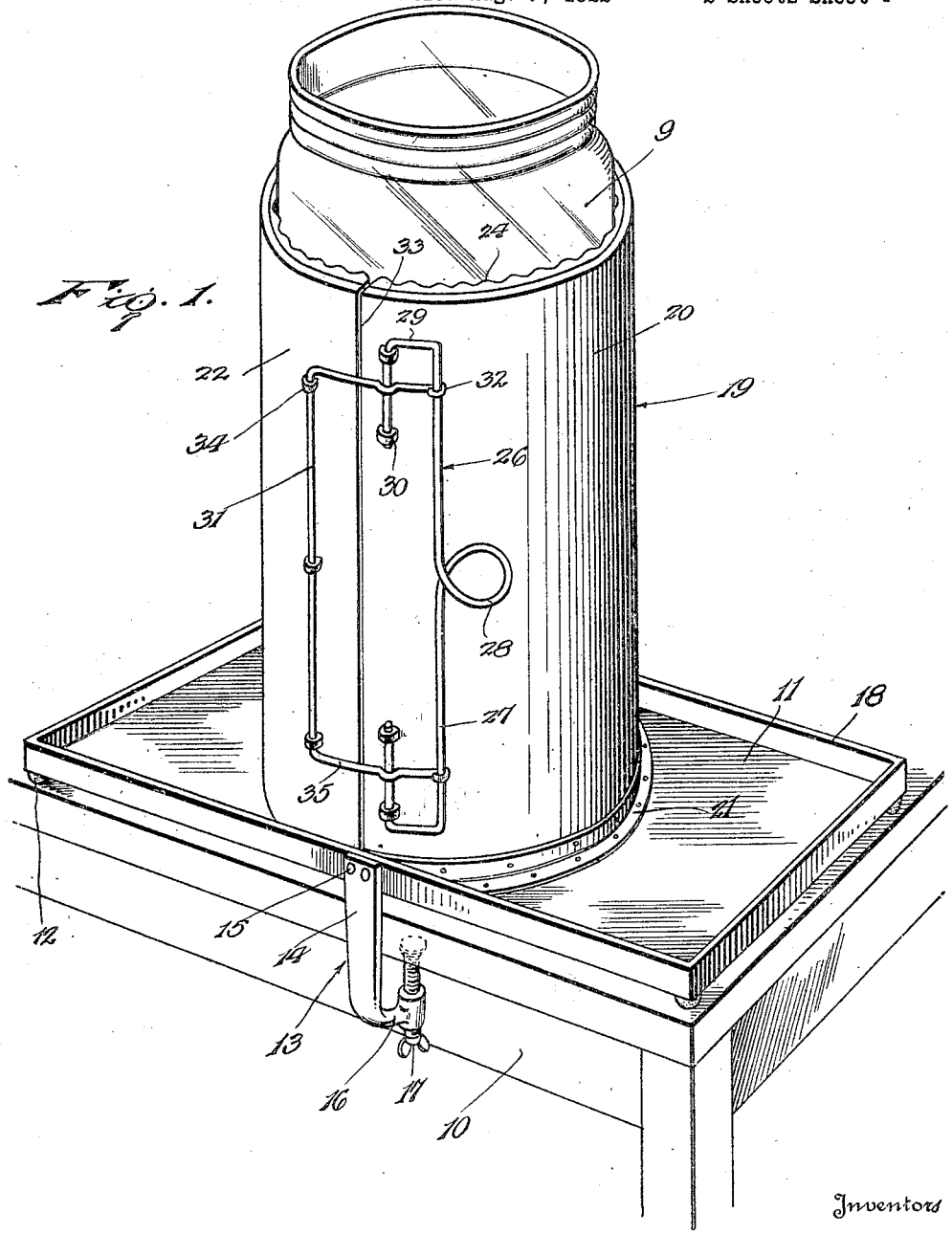

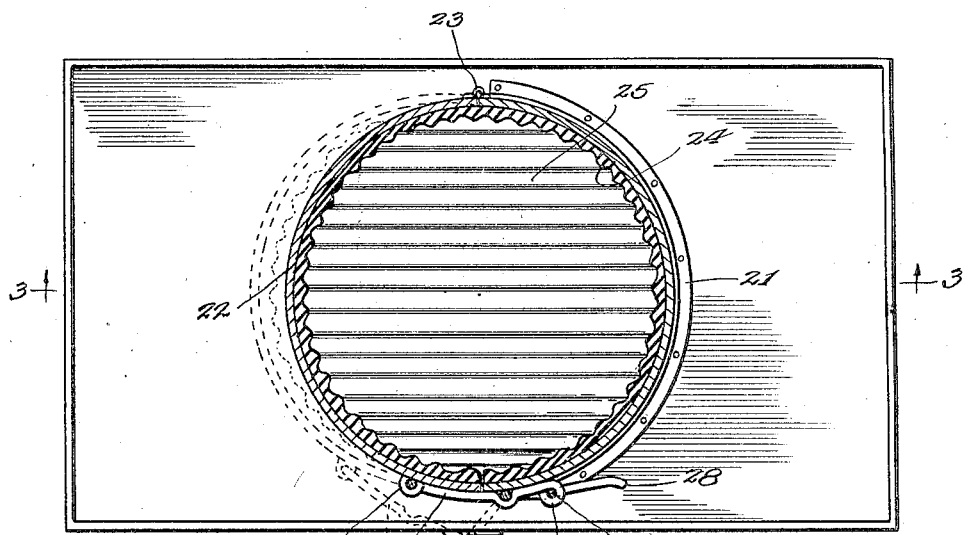
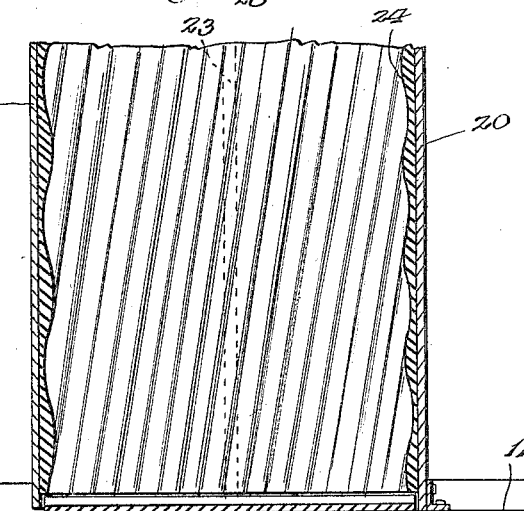

1,470,203

UNITED STATES PATENT OFFICE.

NATHAN P. STONE AND HAROLD SAETER, OF FOSSTON, MINNESOTA.

FRUIT-JAR HOLDER.

Application filed August 3, 1922. Serial No. 579,499.

*To all whom it may concern:*

Be it known that we, NATHAN P. STONE and HAROLD SAETER, citizens of the United States, residing at Fosston, in the county of Polk and State of Minnesota, have invented certain new and useful Improvements in Fruit-Jar Holders, of which the following is a specification.

This invention relates to a kitchen utensil which is intended to save the housewife from holding a jar when putting up preserves thus leaving both her hands free.

The object of the present invention is to provide a holder for jars for preserves such as fruit, jam, jellies and the like. By the use of this holder the jar will be placed firmly on a table until it has been filled and the holder will prevent burning of the operator's hands or soiling them with the preserves which usually are very sticky and no towels will be needed for gripping the jars.

The device may be built in different sizes in accordance with the shape of the jars and the holder may without change be used for jars of slightly different diameters.

In the accompanying drawings one embodiment of the invention is illustrated and

Fig. 1 shows a perspective view of the device with the fruit jar in position.

Fig. 2 is a horizontal section of the device and

Fig. 3 a perpendicular section along line 3—3 of Fig. 2.

In the drawings reference numeral 10 represents a table upon which a tray 11 is placed. This tray is preferably provided with small feet or pads 12 made of rubber or felt to prevent the device from scratching the table and to cause it to adhere more firmly thereto. One or more clamps 13 are furnished consisting of an arm 14 riveted to the side of the tray as at 15 and having a shank 16 bent inwardly and in which is threaded a clamp screw 17 intended to engage beneath the table to hold the tray rigidly thereon. On all four sides of the tray I preferably provide upstanding ledges 18 for catching of the preserves that might run over the top of the jar or be spilled when filling the jar 9.

The holder proper consists of a cylindrical shell 19 which is split longitudinally into two halves one of which 20 is secured on the tray by means of an angle 21 at the lower end of the shell. The cylindrical shell is opened at its top and the loose shell half 22 is hinged as at 23 to the fixed shell half 20 permitting the shell half 22 to be swung open to one side.

Along the inner side of the cylindrical shell 19 is secured a lining 24 preferably made of corrugated rubber and reaching from the top of the cylindrical shell to its bottom. The portion of the tray 11 which is enclosed by the cylindrical shell 19 is also covered with a corrugated piece of rubber 25 in order to prevent the breaking of the jars when inserted in the holder.

For the purpose of closing the holder, a lever 26 is provided which consists of a bent rod 27 having a handle 28 and transverse arms 29 journaled in the hinges 30 secured on the outside of the fixed half 20 of the shell. Another bent rod 31 grips around the lever 26 as at 32 and reaching with arms 35 across the opening 33 of the holder is held in position on the loose shell half 22 by means of lugs or catches 34. The connection between the bent rod 31 and the lugs 34 may be permanent, in which case the lugs 34 form hinge eyelets; or the lugs may be shaped as hooks in which case the bent rod 31 merely catches over the lugs when tightened by the lever 26.

In order to obtain a uniform pressure on the two shell halves, the hinges 30 and the lugs or catches 34 are situated as far apart as possible in perpendicular direction. In this manner the edges 33 will always stand parallel and not deviate at the top or bottom of the holder. It will be evident that the horizontally extending arms 35 reaching across the hinge portion of the lever 26 have to be slightly curved to conform with the cylindrical contour of the shell 19. With the handle 28 turned to the right in Fig. 1 the two halves 20 and 22 of the shell are drawn tightly together, but with the handle 28 swung to the left of this figure, it will be evident that the tightening becomes released and that the loose half 22 of the shell will swing open.

The function of the corrugated rubber lining 24 is to yieldably engage with the jar and to permit a slight difference in diameter of the jars, and it will be evident that by using a double lining, a considerable difference in the diameters of the jars may be permitted and the jars still held firmly in position.

The material used for the holder is preferably metal for the cylindrical shell and the lock, while the tray may be made of wood or other fibrous material or if preferred of metal or a combination of both. All the metal parts may be nickel plated for the sake of appearance and also for preventing rusting.

With the jar holder constructed in accordance with the above given description, a pressure of from fifty to a hundred pounds may be exerted against the jar without injuring the same, this being ample to hold it firmly on the tray.

Having thus described the invention, what is claimed as new is:

A jar holder comprising a tray having a solid bottom and upturned edges on all sides, clamping means for said tray including a downwardly directed arm secured to one of said upturned edges, a shell open at both ends including semicylindrical mating halves of uniform thickness and having hinged connection along two adjacent edges, a supporting element for one of said shell halves rigidly secured thereto and to said tray, a one piece, resilient lining completely covering the inner walls of said shell halves and the hinged edges thereof, a resilient mat upon said tray within said shell, a self locking latch for the shell halves including a lever fulcrumed on said fixed shell half, and links hinged on the loose shell half and having journaled connection with said lever.

In testimony whereof we affix our signatures.

NATHAN P. STONE. [L. S.]
HAROLD SAETER. [L. S.]